United States Patent [19]

Driskill et al.

[11] Patent Number: 4,925,732

[45] Date of Patent: May 15, 1990

[54] BREATHABLE FLEXIBLE LAMINATES ADHERED BY A BREATHABLE ADHESIVE

[75] Inventors: Kathleen R. Driskill, Townsend; Robert L. Henn, Wilmington, both of Del.

[73] Assignee: W. L. Gore & Associates, Inc., Newark, Del.

[21] Appl. No.: 224,970

[22] Filed: Jul. 27, 1988

[51] Int. Cl.$^5$ .................... B32B 27/08; B32B 27/40
[52] U.S. Cl. .................... 428/336; 428/422; 428/423.4; 428/424.6
[58] Field of Search .................... 428/423.4, 422, 336, 428/424.6; 528/61

[56] References Cited

U.S. PATENT DOCUMENTS

| | | | |
|---|---|---|---|
| 3,398,042 | 8/1968 | Odenthal et al. | 428/423.4 |
| 4,367,327 | 1/1983 | Holker et al. | 528/61 |

*Primary Examiner*—Thomas J. Herbert
*Attorney, Agent, or Firm*—Gary A. Samuels

[57] ABSTRACT

A laminate is provided that comprises flexible moisture permeable adherends and a moisture permeable adhesive. The laminate has good moisture transmitting characteristics with good bond strength. The laminate finds utility in functional applications such as shoes. A particular group of laminates are provided that provide for both waterproof characteristics and breathability.

18 Claims, No Drawings

BREATHABLE FLEXIBLE LAMINATES ADHERED BY A BREATHABLE ADHESIVE

FIELD OF THE INVENTION

This invention relates to breathable flexible substrates laminated together by a breathable adhesive. More specifically this invention provides for waterproof, comfortable footwear through the use of a breathable adhesive in assembly. The laminate can be used in other applications such as apparel also.

BACKGROUND

As is well known, the use of adhesives is important in the construction of footwear. Various adhesives are used in affixing the layers and components of the shoe together. For instance adhesives are used in (i)bonding layers of the upper together, (ii)holding the upper to the insole, (iii)maintaining the shape of the shoe once on the last by bonding folds of the upper to itself, and (iv)bonding the upper to the sole.

Adhesives used for shoe assembly are generally employed in one of three ways in the footwear industry. The term "shoe" is used throughout to refer to any product intended to be worn on the foot and produced by the footwear industry. As such it should not be read to be particularly limiting and is intended to include footwear such as boots, socks, and slippers. Adhesives are frequently employed in the so-called cold bonding process, the heat reactivation process, and by application of the adhesive in the melt.

Cold bonding indicates the process where a solvated adhesive is applied to one or both of the substrates, or adherends, to be bonded. Without heating, the layer of adhesive is kept uncovered for a sufficient length of time to allow most of the solvent contained in the adhesive to evaporate. The layers to be bonded are brought into contact while there is sufficient residual solvent contained in the adhesive to provide an effective bond.

Heat reactivation is the process whereby the adhesive is applied to the desired adherend(s) by whatever means most efficient, heating to the required temperature and then immediately combined. The method of heating is generally infrared radiation or hot air. The temperature required to heat-reactivate the adhesive is noticeably not the transition to take the adhesive totally into the melt but is rather a lower temperature. Adhesives known in the art for heat reactivation are generally hydroxyl polyurethanes made from polyesters which have a strong tendency to crystallize. The crystalline segment of the polyesters is melted but not the entire polyurethane to provide the heat reactivation characteristics of the adhesive. For a discussion of this prior art technology see for instance "Polyurethane Handbook", by Gunter Oertel,1985, Carl Hanser Verlag and U.S. Pat. No. 3,718,518.

A melt application of the adhesive can be achieved in numerous ways; for instance, application of the adhesive by solvent and subsequent heating of the residual solids, and combining of the adherends while the adhesive is in a molten phase. Optionally, this might include direct application of the adhesive as a hot melt.

As is well known to those in the footwear industry, not to mention countless users of their products, comfort of the shoe is desired by the wearer. Numerous variables affect the wearer's comfort. Such issues considered are the fit of the shoe, aesthetic appearance, shock absorbency and the microclimate around the foot. See for instance the summary regarding foot comfort by Bunten, J.,"Foot Comfort", 1983, SATRA report SR 44.

The inventive concepts herein concern themselves with the microclimate surrounding the foot and the associated comfort or lack thereof to the wearer. For simplicity herein comfort will therefore concern itself with this microclimate. Comfort is established by the removal of moisture from the area surrounding the foot. As has been well documented in the past this is accomplished by the shoe absorbing and transmitting moisture.

Frequently a compromise in comfort must be balanced by the shoe manufacturer in the assembly of the shoe. For instance comfort may be traded for other factors such as design features, material selection, manufacturing techniques, and cost, to name a few.

In the past, in efforts to provide waterproof footwear, breathable waterproof laminates of, for example, expanded poly(tetrafluoroethylene), sometimes hereinafter ePTFE, have been used in various cofigurations. See for instance U.S. Pat. No. 4,599,810. The inherent comfort features provided for by these breathable waterproof laminates have frequently been compromised through the use of non-breathable adhesives smeared over the breathable surface area of the laminate thus precluding moisture vapor passage. This renders the final product uncomfortable. The lack of the ability of conventional, non-breathable adhesives to transfer moisture away from the foot has caused discomfort to the wearer by creating a moist, hot microclimate around the foot.

The prior art has attempted to address this situation in a number of ways

Elimination of the adhesive altogether, at least in the assembly of the upper, has been tried. This can be accomplished by using the laminate as the only material in the upper. Obvious limitations to options concerning final shoe usage, aesthetic appeal, and fashion have resulted from pursuing this path.

Utilizing alternative fastening techniques available in the trade, specifically stitches and tacks, create another problem. These fastening techniques defeat the waterproof characteristic of the laminate through the generation of holes. These holes in turn must be eliminated to restore the waterproofness.

Minimization of the area of the breathable, waterproof laminate that is covered by the adhesive has been tried. This is done usually when the laminate is the principal component of the shoe as stated above, or when it is sandwiched between shape-holding layers. Where adhesive is still required its damaging influence can be minimized by using it in a discontinuous manner. The adhesive, for example can be applied during assembly only at the borders of the adherends. Alternatively if a greater area is required to be bonded, the adhesive can be applied discontinuously over this area by employing a pattern such as a dot or line pattern currently practiced. In addition adhesive webs have been employed to achieve discontinuity in the adhesive layer. U.S. Pat. No. 3,713,938 taught that the correct combination of the amount of solvated adhesive, substrate, and combining technique achieved a discontinuous adhesive layer to prevent excessive loss of water permeability.

U.S. Pat. No. 3,398,042, to Odenthal, et. al, teaches the use of a breathable adhesive in assembly of shoes of leather to avoid the loss of the inherent breathability of the starting leather materials. Hydrophilic hydroxyl terminated polyurethane materials having an ethylene oxide content of at least 85% as disclosed in U.S. Pat. No. 3,398,042, are inherently weak materials, particularly when wet, and require crosslinking. This patent makes it clear that a second component is necessary in addition to their material to make a final product. This creates for the shoe manufacturer concomitant additional steps and a time delay on the order of days before the adhesive provides its final properties. This time delay further illustrates that the properties are heavily dependent on the crosslinking of their material to provide the necessary adhesion characteristics. Furthermore, achieving the sufficient strength through crosslinking, lowers significantly the moisture transmitting characteristics of these materials. As such, the shoe manufacturer has a more difficult adhesive to fit into manufacturing and, in turn, does not realize all the benefits that conceptually a breathable adhesive offers. A "one-component" adhesive that does not need to be chemically crosslinked would be desirable.

Most of the approaches reviewed supra have been of import in offering comfortable footwear to the marketplace. More specifically these approaches have been employed to various degrees for waterproof, breathable footwear. Unfortunately all of these practices have concomitant limitations. The manufacturer of comfortable footwear is limited by one or all of the following limitations: (1) the need to modify in undesirable ways his manufacturing techniques and/or equipment, (2) reducing the design options possible both in style and in material selection, and (3) compromising the comfort in use to the wearer of the final footwear product.

Obviously, these limitations are less than desirable in the pursuit of the optimum comfort in functional footwear. By way of example, men's dress shoes are expected to be made of fine leather. In creating a functional waterproof shoe through the use of breathable, waterproof laminates, such as ePTFE laminates, an adhesive is used to assemble the laminate liner to the leather upper. The adhesive, however, being non-breathable, compromises all that has gone into creating comfortable leathers and ePTFE laminate combinations. This is undesirable.

The present invention provides a more satisfactory option to the shoe manufacture in assembly of comfortable shoes than the art heretofore available.

SUMMARY OF THE INVENTION

A discovery has now been made which comprises a laminate of flexible, moisture permeable adherend layers bonded together by a breathable adhesive. The breathable adhesive provides for a direct replacement of adhesives used in assembly of shoes without experiencing the loss of breathability associated with those adhesives which preclude moisture transfer and without compromising the manufacturing techniques currently used in shoe manufacture.

In this invention, a one-component, hydrophilic, block polyurethane is applied to the face of one or both adherends to be bonded. In a factory desiring to employ a cold bonding process, the adhesive is applied in a solvated form. Sufficient time is allowed to pass so as most of the solvent is allowed to evaporate. The adherends are then combined under pressure before all of the solvent evaporates, as is the practice with the commercially available, non-breathable adhesives utilized in cold bonding processes. Likewise, in a factory desiring to employ a heat reactivation process, after the application of the adhesive to the adherend(s), any solvent present is either allowed to evaporate or is driven off by heat. The "dry" adhesive film is then reactivated by heat, normally flash reactivation via an infrared source, and then the adherends are combined immediately with sufficient time and pressure to effect a satisfactory bond. Part of the inventive nature herein is that these processes require no significant modification over those common in footwear manufacture currently. As such, the more preferred breathable adhesive class herein offers a direct replacement for the currently used non-moisture permeable adhesives.

The laminate of this invention exhibits inherent moisture permeability. As such, it is essential that the adherends which are employed in combination with the breathable adhesive are moisture permeable. Accordingly the product of this invention is a laminate comprising (i) flexible adherends having a combined moisture permeability of at least 140 $g/m^2 \times 24$ hr., and adhered by by (ii) an adhesive having a moisture permeability of at least 1000 $g/m^2 \times 24$ hr. in a continuous film of at least 25 micron thickness;

said adhesive being a one-component, hydrophilic, block polyurethane consisting of both hard and soft segments;

the soft segment being a polyol containing oxyethylene units, the hard segment being the reaction product of polyisocyanate and chain extender;

wherein the laminate has a moisture permeability of at least 120 $g/m^2 \times 24$ hr.

One preferred laminate of this invention is wherein:

(a) the flexible adherends have a combined moisture permeability of at least 300 $g/m^2 \times 24$ hr., and (b) the adhesive has a moisture permeability of at least 1000 $g/m^2 \times 24$ hr. in a continuous film of at least 25 micron thickness, and (c) the laminate has a moisture permeability of at least 250 $g/m^2 \times 24$ hr.

Another preferred laminate of this invention is one wherein:

(a) the flexible adherends have a combined moisture permeability of at least 650 $g/m^2 \times 24$ hr., and (b) the adhesive has a moisture permeability of at least 5000 $g/m^2 \times 24$ hr. in a continuous film of at least 25 micron thickness, and (c) the laminate has a moisture permeability of at least 600 $g/m^2 \times 24$ hr.

The laminates of this invention demonstrate a wet bond strength of at least 0.3 kgf/cm or a wet bond strength at least as great as the cohesive failure of an adherend.

The products of this invention exhibit both moisture permeability and a durable, flexible bonding of the adherends employed, even when wet with water. As such these laminates make useful components in shoes or in any other product where a combination of materials are employed in an application such that it is desirable to have a microclimate, enclosed in part or full by the laminate of this invention, which does not exhibit excessive moisture buildup.

A preferred application of the laminate of this invention is in breathable, waterproof laminates for shoe uppers. In one embodiment, one of the adherends is an expanded poly(tetrafluoroethylene) laminate and the other is leather. The waterproof characteristic is provided by the ePTFE laminate, the leather imparting characteristics such as aesthetics and durability if employed on the exterior, or alternatively water absorption if employed on the interior. The inherent moisture permeability of the adherends is not damaged when in the laminate of this invention and as such, a more functional laminate for shoe upper is now achieved by the laminate of this invention.

Alternatively waterproofness of the laminate can be achieved by the adhesive if care is exercised in assuring a continuous layer of the adhesive between the adherends. As such different adherends can be selected, for example, a durable attractive leather for the exterior, and a soft, water absorbing leather for the interior. Clearly new laminates can now practically be considered than heretofore were possible.

Methods of making the laminate are also provided which comprise reactivation of the adhesive and subsequent combining of the adherends, and alternately, where applicable or desirable, using a breathable adhesive in a film form to combine the adherends.

DETAILED DESCRIPTION OF THE INVENTION

As used herein, a laminate consists of at least two flexible adherends bonded together by an adhesive. In particular both the adherends and the adhesive demonstrate the ability to transfer moisture vapor, or breathe.

It has been recognized that materials must be "breathable" to be comfortable. This is equally true for materials intended to be worn on the body or covering the foot. It is, however, not necessary that the material pass air for it to be comfortable, only that water vapor from perspiration be transmitted from inside to out so that the microclimate is not unduly wet and so that a natural evaporative cooling effect can be achieved. As such, breathability and the ability to transport moisture vapor are used interchangeably herein.

The inherent characteristic of the adherends to transmit moisture vapor can simply be summarized as being provided by either one of two basic mechanisms known in the art. Moisture is either transmitted by porous diffusion or a by solution-diffusion mechanism.

The ability of the adhesive to transmit moisture vapor is explained characteristically by the solution-diffusion mechanism. This mechanism requires that the adhesive demonstrate a capacity to "solubilize" water within its molecular chain. Materials demonstrating this capability are hydrophilic in nature. If a continuous film of hydrophilic material is exposed t air containing substantial water vapor on one side of the film and to air containing less water vapor on the other side, the side of the film exposed to the higher water vapor concentration will absorb water molecules which, in turn, diffuse through the film and are desorbed or evaporated on the side exposed to the lower water vapor concentration. Thus, water vapor is effectively transported through the film on a molecule by molecule basis. This property is known as "breathability".

It has now been discovered that the breathability aspects of the cited materials can, with care in selection of the materials, be assembled into a final laminate having final desirable and unique properties. Specifically it has been determined that in selecting adherends that, in combination, provide a moisture permeability of at least 140 $g/m^2 \times 24$ hr., a laminate of superior moisture permeability is achieved when assembled with an adhesive of appropriate breathability. With adherends demonstrating combined moisture permeability lower than 140 $g/m^2 \times 24$ hr., the laminate produced from a breathable adhesive offers no practical advantage over laminates produced from commercially available, non-breathable adhesives. As such the laminate produced of such adherends, even with a breathable adhesive, is outside the scope of this invention.

When a laminate is constructed from materials meeting these moisture permeability criteria, a final product is achieved having uniquely beneficial moisture permeability. In particular these criteria allow for the creation of desirable laminates in the construction of shoes. These criteria, for example, allow for the screening of leathers to be used in a shoe upper as the exterior leather and the interior leather lining. Having properly screened and selected the appropriate functional leathers they can then be assembled in the shoe construction with a breathable adhesive to yield a more comfortable shoe. It should be noted here that because of the breathable nature of the adhesive, variations in coverage during shoe assembly do not preclude the passage of moisture vapor, and as such the manufacturer of the shoe does not destroy the desirable characteristics of the leather selected. As a matter of fact, the shoe upper of this illustration can be given waterproof characteristics if the adhesive forms a continuous film. In addition the breathable nature of the adhesive does not consequently preclude moisture transfer. Therein simultaneously a shoe being comfortable and having waterproof characteristics is achieved.

A most desirable laminate is achieved when at least one of the adherends contains flexible expanded poly(tetrafluoroethylene). Expanded PTFE is a porous structure in which the pores are microvoids that interconnect throughout the structure. Frequently void content will be 80% or more of the structure volume. Expanded PTFE can be preferred as described in U.S. Pat. No. 3,953,566. Practical, performing constructions are described in Gore and Allen, U.S. Pat. No. 4,194,041. This material imparts to the shoe the desirous property of waterproofness. The breathable adhesive then serves the purpose of providing construction options without precluding the moisture transfer properties of the ePTFE construction. To fully enjoy the characteristics of this adherend a more preferable combined adherend moisture permeability is at least 650 $g/m^2 \times 24$ hr. This provides high performance, comfortable, waterproof footwear.

A more preferred adhesive has a moisture permeability of at least 5000 $g/m^2 \times 24$ hr. A moisture permeability of this magnitude gives high confidence that the adhesive is not the primary component in inhibiting the flux of moisture through the laminate. A laminate of the more preferred criteria has numerous conceivable application areas where control of the microclimate is important. These areas might include, in addition to footwear; gloves, garments, clothing inserts, hats, socks, vehicle covers, and mattress covers.

As used herein, a flexible adherend is deemed to be a material that is expected to bend or flex in the usage of the laminate. Adherends of choice in this invention are either leather or a textile, in combination with a breathable, waterproof laminate. Other useful flexible adherends include materials that are woven, knitted, or nonwoven; membranes, coated materials, foams, composite materials, insulation, and films.

Practical useful adhesives have been found to be block copolymers, of hard and soft segments. The reason for this is believed to be several. The block nature of these polymers allow for the creation of different functions in each segment. Specifically the soft segment can provide for the necessary hydrophilicity to allow moisture transmission. The hard segment provides the necessary reinforcement of the weaker (particularly when swollen with water) soft segment and in turn the block copolymer is strong enough to function directly as an adhesive. Furthermore this block structure through its tendency to form two phases of soft segment and hard segment generates the necessary physical properties immediately after application.

A preferred class of block copolymers is one-component, hydrophilic, block polyurethanes. More specifically polyurethanes wherein hydrophilicity is afforded by a soft segment consisting of a polyol containing oxyethylene units. i.e. ($-O-CH_2CH_2-$). The hard segment of these materials is the reaction product of polyisocyanate and chain extender.

The preferred adhesives used herein are believed to be useful because they can be a direct replacement of the adhesives being used in existing footwear manufacturing plants. As such, these adhesives are solvated and can be used either in cold bonding, heat reactivation or melt processes as discussed supra. Most pleasing is the heat reactivation quality of these polyether urethanes. As a result it has been found that an adhesive can be both heat reactivatable and breathable. It is believed that the heat reactivation characteristic is not provided for by the soft segment crystalline melt as in commercially available nonbreathable polyester urethane adhesives. It is believed that this characteristic of the preferred adhesives taught herein is afforded by the hard segments.

One class of useful polyurethanes comprise the reaction product of:
(i) a polyol (A) having a number average molecular weight of from about 600 to about 3500 and having a functionality of at least 2;
(ii) a isocyanate (B) having a functionality of at least 2; and
(iii) a low molecular weight chain extender (C) having a molecular weight in a range lower than about 500 and having a functionality of at least 2,
wherein the reactants are employed in such proportions so as to satisfy the following equations:

$$\frac{EqNCO}{EqOH + EqCE} > = 1.1$$
$$EqOH > = EqCE$$
$$EqCE > 0,$$

wherein EqNCO is the molar equivalent of the isocyanate species employed, and EqOH and EqCE denote the respective molar equivalents of the polyol and chain extender employed, the soft segment being provided by the polyol of primarily oxyethylene units, and the suitable hard segments being provided by the reaction product of the isocyanate and chain extender. Within this class, preferred is the reaction product of:
(i) a polyol (A) of primarily oxyethylene units, having a number average molecular weight of from about 600 to about 3500;
(ii) a polyisocyanate (B); and
(iii) a low molecular weight bifunctional chain extender (C) having a molecular weight in a range lower than about 500. Within this class, more preferred is the reaction product of:
(i) a poly(alkylene ether)glycol (A) of primarily oxyethylene units, having a number average molecular weight of from about 600 to about 3500;
(ii) a diisocyanate (B); and
(iii) a low molecular weight bifunctional chain extender (C) having a molecular weight in a range lower than about 500.

The more preferred class of polyurethanes useful herein are the reaction product of:
(i) a poly(oxyalkylene)glycol (A) of primarily oxyethylene units, having a number average molecular weight of from about 600 to about 3500;
(ii) a polyisocyanate (B);
(iii) a low molecular weight bifunctional chain extender (C) having a molecular weight in a range lower than 500; and optionally
(iv) a chain terminator (D).

The most preferred adhesive are polyurethanes of this class having; A being a poly(oxyalkylene)glycol of molecular weight between about 1,000–2,000 and containing in excess of 70% oxyethylene units, B being a mixed isomer of dicyclohexylmethane 4,4, 4,4'-diisocyanate, and C being a glycol having a molecular weight less than 500, D being a chain terminator which is reactive with any residual isocyanate moieties.

TEST PROCEDURES

A variety of different tests have been used in the examples. These are described as follows:

MOISTURE VAPOR TRANSMISSION RATE TEST - (MVTR)

A description of the test employed to measure moisture vapor transmission rate (MVTR), also referred to as moisture permeability, is given. The procedure has been found to be suitable for the materials and products of this invention. Of note is the modification required for materials such as leather.

Samples are die-cut circles of 7.4 cm diameter. The samples are conditioned in a 23° C., 50% relative humidity test room for 48 hours prior to testing.

Test cups are prepared by placing 15 ml of distilled water and 35 g of sodium chloride salt into a 4.5 ounce polypropylene cup, having an inside diameter of 6.5 cm at the mouth. An expanded PTFE membrane (ePTFE), available from W. L. Gore and Associates, Incorporated, Elkton, Maryland, is heat sealed to the lip of the cup to create a taut, leakproof microporous barrier holding the salt solution in the cup. A similar ePTFE membrane is mounted taut within a 5 inch embroidery hoop and floated upon the surface of a water bath in the test room. Both the water bath and the test room are temperature controlled at 23 C.

The sample is laid upon the floating membrane, a salt cup is weighed, inverted and placed upon the sample. After one hour, the salt cup is removed, weighed, and the moisture vapor transmission rat is calculated from the weight pickup of the cup as follows:

MVTR (g/[$m^2 \times$ 24 hr.]) = Weight (g) water pickup in cup/ [Area ($m^2$) of cup mouth $\times$ Time (days) of test ]

Because the leathers used in these examples were very thick and absorbent materials, all leather samples were equilibrated on the bath for 17 hours (complete with a salt cup on the sample). The one hour test was then immediately performed upon the sample. This step has been found to allow for steady state transmission to be measured, as the absorption of moisture vapor into even the thickest of shoe upper leathers tested was determined to have occurred during the first 17 hours upon the bath.

A combined moisture permeability is determined by one of two ways. The preferred way is to place the two adherends physically in contact, without adhesive, between the two ePTFE membranes of the the test, as taught above. In this manner the adherends are positioned such that the measurement is a direct determination of the moisture vapor transmission rate of the adherends in series. There are certain situations where this configuration is not practical and as such the combined moisture permeability (used interchangeably with moisture vapor transmission rate herein, MVTR) can be mathematically determined from the previously independently determined moisture transmission rate of the two adherends. This is accomplished by equating the sum of the reciprocals of the adherend MVTRs to the reciprocal of the combined MVTR and solving for the combined MVTR.

Concerning the moisture permeability of the adhesive employed in assembling the laminates of this invention it has been determined that an MVTR of at least 1000 $g/m^2 \times 24$ hr. as measured on a freestanding film of film thickness 25 micron provides for laminates of beneficial moisture permeability. This moisture permeability should be measured directly according to the test method taught below. If thicker films are measured having a direct measurement of at least 1000 $g/m^2 \times 24$ hr. then it may be assumed that an MVTR on a 25 micron film would likewise be in excess of 1000 $g/m^2 \times 24$ hr. This is to caution against mathematical normalization for determination of an MVTR value of a film of thickness 25 micron.

BOND STRENGTH TEST

For tensile testing, Method 500A, Footwear Institute of America (FIA), 1984 was used. Dry peel testing was performed on laminates stored at 50-65% relative humidity for 72 hours prior to testing. Wet peel testing was performed on laminates soaked in water for 6 hours prior to testing.

WATERPROOFNESS TESTING

Laminates of the present invention were tested for waterproofness by using a modified Suter test apparatus, which is a low water entry pressure challenge. Water was forced against a sample area of 2.5 cm diameter sealed by two rubber gaskets in a clamped arrangement. The sample was open to atmospheric conditions and was visible to the operator. The water pressure on the sample was increased to 20 kPa by a pump connected to a water reservoir, as indicated by an appropriate gauge and regulated by an in-line valve. The test sample was at an angle and the water was recirculated to assure water contact and not air against the sample's lower surface. The upper surface of the sample was visually observed for a period of 5 minutes for the appearance of any water which would be forced through the sample. Liquid water seen on the surface was interpreted as a leak. A passing (waterproof) grade was given for no liquid water visible within 5 minutes. Passing this test is the definition of "waterproofness" as used herein.

EXAMPLES

The invention is illustrated in the following examples and should be understood as guided by all of the preceding. These examples are to be understood therefore according to the scope and spirit of the invention described above and not to suggest otherwise.

EXAMPLE 1

Example 1 demonstrates that a moisture permeable laminate is made from moisture permeable adherends and a moisture permeable adhesive. The adherends are fabric and leather; and the adhesive is a one-component, hydrophilic, block polyurethane.

A moisture permeable adhesive was made by charging 498 g (3.80 molar equivalents) of dicyclohexylmethane-4,4' diisocyanate, diisocynate, 613 g dichloromethane and 1.7 g dibutyltin dilaurate to a one liter reactor equipped with a thermocouple, stirrer and closed to air except for a drying tube adapter. With stirring, 161.5 g (3.06 molar equivalents) 2,2'-oxybis(ethanol), a chain extender, in 920 g dichloromethane was slowly added over three hours. An additional 1.7 g dibutyltin dilaurate in 100 g dichloromethane was added and the reaction was stirred for one hour. 540 g (0.76 molar equivalents) poly(oxyethylene)glycol in 510 g dichloromethane was then added over 60 minutes. For six days following, 1867 g dichloromethane was gradually added as the reaction product thickened. At the end of this time, the free isocyanate content was determined to be 0.13% by a standard dibutylamine titration procedure. 3.2 g dibutylamine in 793 g dichloromethane was added. The reaction product was stirred for 8 hours then placed into a container. No free isocyanate functional groups in the final product were detected at 2270 $cm^{-1}$ by infrared analysis. This material is referred to as Adhesive A.

The resultant solids level of Adhesive A was —20%.

A 76 micron thick film of Adhesive A had a measured moisture vapor transmission rate (MVTR) of 4500 $g/m^2 \times 24$ hr. by the test method described.

A laminate of this invention was made by the cold bonding method. The flesh side of a 7.5 cm square of 0.23 cm thick cowhide leather (MVTR = 857 $g/m^2 \times 24$ hr.) and one side of a 7.5 cm square of nylon fabric (MVTR 5034 $g/m^2 \times 24$ hr.) were coated with Adhesive A, and combined. Light pressure (—20 psi) was briefly applied to the laminate. The laminate was allowed to dry in a ventilated area for 24 hours before testing was begun.

The two unbonded adherends had a combined MVTR of 857 $g/m^2 \times 24$ hr. The leather-fabric laminate bonded with Adhesive A had an MVTR of 980 $g/m^2 \times 24$ hr. indicating that a moisture permeable laminate was made.

Bond strength of the laminate was 1.50 kgf/cm in the dry peel test and 1.27 kgf/cm in the wet peel test.

Suter testing caused water leakage in the unbonded adherend combination within 5 seconds. The laminate herein did not leak after 5 minutes. This fact further illustrates that a breathable, waterproof laminate can be produced simultaneously.

EXAMPLE 2

Example 2 demonstrates that a moisture permeable laminate is made from moisture permeable adherends and a moisture permeable adhesive. The adherends are leather and the adhesive is a one-component, hydrophilic, block polyurethane.

A moisture permeable adhesive was made by charging 3711 g (5.58 molar equivalents) of poly(oxyethylene)glycol to a 5 liter reactor equipped with a heated jacket, thermocouple, stirrer, vacuum outlet, and nitrogen gas inlet/outlet. The glycol was degassed to remove water at 95 C and 5 torr for 90 minutes, then cooled to 80 C. The vacuum was disconnected and a nitrogen gas atmosphere was applied. 1395 g (11.16 molar equivalents) of 4,4-diphenylmethane diisocyanate was added and the reaction was stirred at ~80 C until the isocyanate group content was measured by a standard dibutylamine titration method to be 4.68%. To 1180 g of the cooled reaction product, 1180 g toluene and 2360 g acetone added. 81 g (0.80 molar equivalents) hydroquinone di(B-hydroxyethyl)ether, a chain extender, and 3.5 g stannous octoate were added, and the reaction product was stirred ~25° C. for 24 hours, then bottled. The free isocyanate value was measured at 0.64%. The product is referred to as Adhesive B.

The solids content of Adhesive B was ~26%. A 170 micron thick film of Adhesive B had an MVTR of 4570 $g/m^2 \times 24$ hr.

A moisture permeable laminate of this invention was made by the cold bonding method, as in Example 1. The moisture permeable leather adherend of Example 1 was bonded to itself using Adhesive B.

The two unbonded adherends had a combined MVTR of 557 $g/m^2 \times 24$ hr. The leather-leather laminate bonded with Adhesive B had an MVTR of 434 $g/m^2 \times 24$ hr. indicating that a moisture permeable laminate was made.

Bond strength of the laminate was 7.62 kgf/cm in the dry peel test and and 2.72 kgf/cm in the wet peel test.

The unbonded adherends leaked in the Suter tester after 7 seconds. The laminate made with Adhesive B did not leak after 5 minutes, again illustrating a functional waterproof, moisture vapor permeable laminate.

EXAMPLE 3

Example 3 demonstrates that a moisture permeable laminate is made from moisture permeable adherends and a moisture permeable adhesive. The adherends are leather and the adhesive is a one-component, hydrophilic, block polyurethane.

A moisture permeable adhesive was made by charging 1163 g (9.30 molar equivalents) of 4,4'-diphenylmethane diisocyanate to a 5 liter reactor equipped with heated jacket, thermocouple, stirrer, and nitrogen gas inlet/outlet. The diisocyanate was melted at 80 C under nitrogen. 3402 g (4.65 molar equivalents) poly(oxyethylene)glycol was melted at 70 C and added to the reactor with stirring. The reaction was stirred at 85 C for 2 hours. The free isocyanate value was found to be 4.20%, as determined by a standard dibutylamine titration procedure. The reaction product was heated to 95 C and 235 g (2.33 molar equivalents) of hydroquinone di(B-hydroxyethyl)ether, a chain extender, was added. The reaction product was heated to 111 C over the next hour, then bottled. The free isocyanate content of the adhesive was measured to be 2.10%. The product is referred to as Adhesive C.

The solids content of Adhesive C was 100%. A 51 micron thick film of Adhesive C had an MVTR of 7088 $g/m^2 \times 24$ hr.

A moisture permeable laminate of this invention was made as follows. A thin film (25-375 micron thick) of Adhesive C was cast onto release paper. The flesh side of the moisture permeable leather adherend described in Example 1 was immediately laid upon the adhesive. Light pressure (~20 psi) was briefly applied. After ~3 minutes, the remaining adhesive face was peeled from the release paper and heated lightly. The second leather adherend was combined to the adhesive with light pressure. The final laminate was allowed to stand 24 hours before testing.

The two unbonded adherends had a combined MVTR of 557 $g/m^2 \times 24$ hr.. The leather laminate made with Adhesive C had an MVTR of 514 $g/m^2 \times 24$ hr., indicating that a moisture permeable laminate was made.

Bond strength of the laminate was 5.08 kgf/cm in the dry peel test and 1.45 kgf/cm in the wet peel test.

The two unbonded adherends leaked in the Suter tester after 7 seconds. The laminate showed no water leakage after five minutes, again illustrating a functional waterproof, moisture vapor permeable laminate.

EXAMPLE 4

Example 4 demonstrates that a moisture permeable laminate is made from moisture permeable adherends and a moisture permeable adhesive. The adherends are leather and a waterproof fabric material. The adhesive is a one-component, hydrophilic, block polyurethane.

A moisture permeable adhesive was made by charging 204.8 g (1.56 molar equivalents) of dicyclohexylmethane-4,4'-diisocyanate to a 1 liter reactor equipped with a heated jacket, thermocouple, stirrer and nitrogen gas inlet/outlet. The diisocyanate was brought to 70 C under a nitrogen gas blanket. A mixture of 0.03 g dibutyltin dilaurate and 44.1 g (0.84 molar equivalents) 2,2'-oxybis(ethanol), a chain extender, was added slowly over a one hour period. The reaction mixture was held below 85 C during this step. 228.8 g (0.31 molar equivalents) of poly(oxyethylene)glycol was added, then a mixture of 0.01 g dibutyltin dilaurate and 22.3 g (0.42 molar equivalents) 2,2'-oxybis(ethanol) was slowly added. The reactor jacket temperature was increased such that the reaction temperature rose over the next 70 minutes to 133 C. The reaction product was contained and cooled. The free isocyanate value was measured at 0.010% by a standard dibutylamine method. The product was held at 120 C for 1 day, and ~25 C for 2 days. The product was heated to 120 C and was milled to 0.6 cm thick. No free isocyanate functional groups were detected in the final product at 2270 $cm^{-1}$ by infrared analysis.

The product was diluted with dichloromethane to 20 % solids and is referred to as Adhesive D.

A 90 micron thick film of Adhesive D had an MVTR of 5960 $g/m^2 \times 4$ hr.

A moisture permeable laminate of this invention was made as follows. The moisture permeable adherends were 0.15 cm thick cowhide leather (MVTR = ~2050 $g/m^2 \times 24$ hr.) and a waterproof material made by adhering a membrane of U.S. Pat. No. 4,194,041 to a knit fabric. The waterproof adherend had an MVTR of 4600 $g/m^2 \times 24$ hr. Adhesive D was applied to a 7.5 cm square of each material in a dotted pattern. The adhesive was allowed to dry for 2 hours, then the two coated faces were placed together. Heat was applied with a household iron to the fabric side of the laminate for ~20 seconds. The laminate was allowed to stand 3 hours before testing.

The two unbonded adherends had a combined MVTR of 1430 $g/m^2 \times 24$ hr. The laminate made with Adhesive D had an MVTR of 1186 g/m²×24 hr. indicating that a moisture permeable laminate was made.

In bond strength testing, the laminate showed cohesive adherend failure in both the dry and the wet peel tests.

Both the unbonded and bonded adherends passed 5 minutes on the Suter tester.

EXAMPLE 5

To demonstrate versatility in adherend selection, materials typical to making gloves were bonded. Adhesive A was used.

A moisture permeable laminate of this invention was made as follows. The moisture permeable adherends used were: a polypropylene glove liner (MVTR = 5240 g/m²×24 hr.), a nylon glove shell (MVTR = 4560 g/m²×24 hr.), and a waterproof glove insert membrane of U.S. Pat. No. 4,194,041 (MVTR = 7869 g/m²×24 hr.). Dry films of Adhesive A (105 micron thick) were placed between the glove shell and the insert and also between the insert and the glove liner. The laminate was bonded by the method described in Example 4.

The three unbonded adherends had a combined MVTR of 2180 g/m²×24 hr. The MVTR of the laminate bonded with Adhesive A was 1215 g/m²×24 hr. indicating that a moisture permeable laminate was made.

In bond strength testing, the laminate showed cohesive adherend failure in both the dry and the wet peel tests.

No leaks were detected after 5 minutes on the Suter tester for either the combined unbonded adherends or for the laminate.

EXAMPLE 6

Example 6 demonstrates that a moisture permeable laminate is made from moisture permeable adherends and a moisture permeable adhesive. The adherends are fabric and a waterproof fabric material. The adhesive is a one-component, hydrophilic, block polyurethane.

A moisture permeable laminate of this invention was made by the heat reactivation method as follows. The moisture permeable adherends were a nylon fabric (MVTR = 5070 g/m²×24 hr.) and a waterproof material made by adhering a membrane of U.S. Pat. No. 4,194,041 to a knit fabric. The waterproof adherend had an MVTR of 2020 g/m²×24 hr. Adhesive A was applied to a 7.5 cm square of each material and allowed to dry. Heat was applied to the adhesive with a heat gun for ~30 seconds, then the two adherends were joined with ~20 psi pressure. The laminate was allowed to stand for one hour before testing.

The two unbonded adherends had a combined MVTR of 933 g/m²×24 hr. The laminate made with Adhesive A had an MVTR of 832 g/m²×24 hr. indicating that a moisture permeable laminate was made.

Bond strength for the laminate was 1.6 kgf/cm in the dry peel test and 1.1 kgf/cm in the wet peel test.

Both the unbonded and bonded adherends passed 5 minutes on the Suter tester.

COMPARISON EXAMPLE 1

Comparison example demonstrates that a moisture impermeable laminate is made from moisture permeable adherends and a moisture impermeable adhesive.

A laminate was made using the cold bonding method, using the moisture permeable leather and fabric adherends described in Example 1. A commercially available shoe adhesive was used. A 61 micron thick film of this adhesive had an MVTR of 0 g/m²×24 hr.

The two unbonded adherends had a combined MVTR of 857 g/m²×24 hr. The laminate bonded with the commercial adhesive had an MVTR of 0 g/m²×24 hr. indicating no moisture permeability.

Bond strength of the laminate was 3.1 kgf/cm in the dry peel test and 0.6 kgf/cm in the wet peel test.

Suter testing of the laminate showed no leak after 5 minutes.

COMPARISON EXAMPLE 2

Comparison Example 2 demonstrates that a moisture impermeable laminate is made from a moisture impermeable adherend combination and a moisture permeable adhesive.

A laminate was made as follows. The adherends were 0.25 cm thick leather with an MVTR = 0 g/m²×24 hr. and a waterproof material made by adhering a membrane of U.S. Pat. No. 4,194,041 to a knit fabric. The waterproof adherend had an MVTR of 1770 g/m²×24 hr. The moisture permeable adhesive was Adhesive A. The bonding method as described in Example 4 was used.

The two unbonded adherends had a combined MVTR of 0 g/m²×24 hr. The MVTR of the laminate bonded with Adhesive A was 0 g/m²×24 hr. indicating no moisture permeability.

Bond strength of the laminate was 2.0 kgf/cm in the dry peel test and 1.4 kgf/cm in the wet peel test.

The laminate did not leak water by the Suter method after 5 minutes.

What is claimed is:

1. A laminate comprising:
   (i) flexible adherends having a combined moisture permeability of at least 140 g/m²×24 hr., and adhered by
   (ii) an adhesive having a moisture permeability of at least 1000 g/m²×24 hr. in a continuous film of at least 25 micron thickness; said adhesive
   being a one-component, hydrophilic, block polyurethane consisting of both hard and soft segments;
   the soft segment being a polyol containing oxyethy units,
   the hard segment being the reaction product of polyisocyanate and chain extender;
   said polyol having a number average molecular weight of from about 600 to about 3500 and having a functionality of at least 2;
   said isocyanate having a functionality of at least 2; and said chain extender having a molecular weight in a range lower than about 500 and having a functionality of at least 2; wherein the reactants are employed in such proportions so as to satisfy the following equations:

$$\frac{EqNCO}{EqOH + EqCE} \geq +0.99 \; EqCE > 0,$$

wherein EqNCO is the equivalent of the isocyanate species employed, and EqOH and EqCE denote the respective molar equivalents of the polyol and chain extended employed, the soft segments being provided by the polyol of primarily oxyethylene units, and the suitable hard segments being provided by the reaction product of the isocyanate and chain extender and which induce phase-separation of the hard and soft segments;

and wherein the laminate has a moisture permeability of at least 120 g/m²×24 hr., and a wet bond strength of at least 0.3kgf/cm.

2. The laminate of claim 1 wherein at least one adherend contains flexible expanded poly(tetrafluoroethylene).

3. The laminate of claim 1 wherein the adherend exhibits a wet bond strength at least as great as the cohesive failure of the adherends.

4. The laminate of claim 1 wherein the adhesive has a moisture permeability of at least 5,000 g/m²×24 hr. in a continuous film of at least 25 micron thickness.

5. The laminate of claim 1 wherein the laminate has a moisture permeability of at least 250 g/m²×24 hr.

6. The laminate of claim 1 wherein the laminate has a moisture permeability of at least 600 g/m²×24 hr.

7. The laminate of claim 1 wherein:
   (a) the flexible adherends have a combined moisture permeability of at least 300 g/m²×24 hr., and
   (b) the adhesive has a moisture permeability of at least 1000 g/m²×24 hr. in a continuous film of at least 25 micron thickness, and
   (c) the laminate has a moisture permeability of at least 250 g/m²×24 hr.

8. The laminate of claim 1 wherein:
   (a) the flexible adherends have a combined moisture permeability of at least 650 g/m²×24 hr., and
   (b) the adhesive has a moisture permeability of at least 5000 g/m²×24 hr. in a continuous film of at least 25 micron thickness, and
   (c) the laminate has a moisture permeability of at least 600 g/m²×24 hr.

9. The laminate of claim 1 wherein at least one adherend is waterproof.

10. The laminate of claim 1 wherein one adherend contains flexible expanded poly(tetrafluoroethylene) and another adherent is leather.

11. The laminate of claim 1 wherein the adhesive is a polyurethane that is the reaction product of
   (i) a poly(oxyalkylene)glycol (A) of primarily oxyethylene units, having a number average molecular weight of from about 600 to about 3500;
   (ii) a polyisocyanate (B);
   (iii) a low molecular weight bifunctional chain extender (C) having a molecular weight in a range lower than 500; and optionally
   (iv) a chain terminator (D).

12. The laminate of claim 1 used in a shoe.

13. The laminate of claim 1 used in a glove.

14. The laminate of claim 1 used in a garment.

15. The laminate of claim 1 used in clothing inserts.

16. The laminate of claim 1 used in vehicle covers.

17. The laminate of claim 1 used in a mattress cover.

18. The laminate of claim 1 wherein the functional waterproofness is provided by the adhesive layer.

* * * * *